M. CLARKE.
BELT SHIFTER FOR COAL JIGGERS.
APPLICATION FILED MAR. 16, 1915.

1,163,216.

Patented Dec. 7, 1915.
4 SHEETS—SHEET 2.

Witnesses
J. N. Woodson
W. H. Woodman

Inventor
M. Clarke.

By
H. A. Stacey, Attorneys

M. CLARKE.
BELT SHIFTER FOR COAL JIGGERS.
APPLICATION FILED MAR. 16, 1915.
1,163,216.
Patented Dec. 7, 1915.
4 SHEETS—SHEET 3.
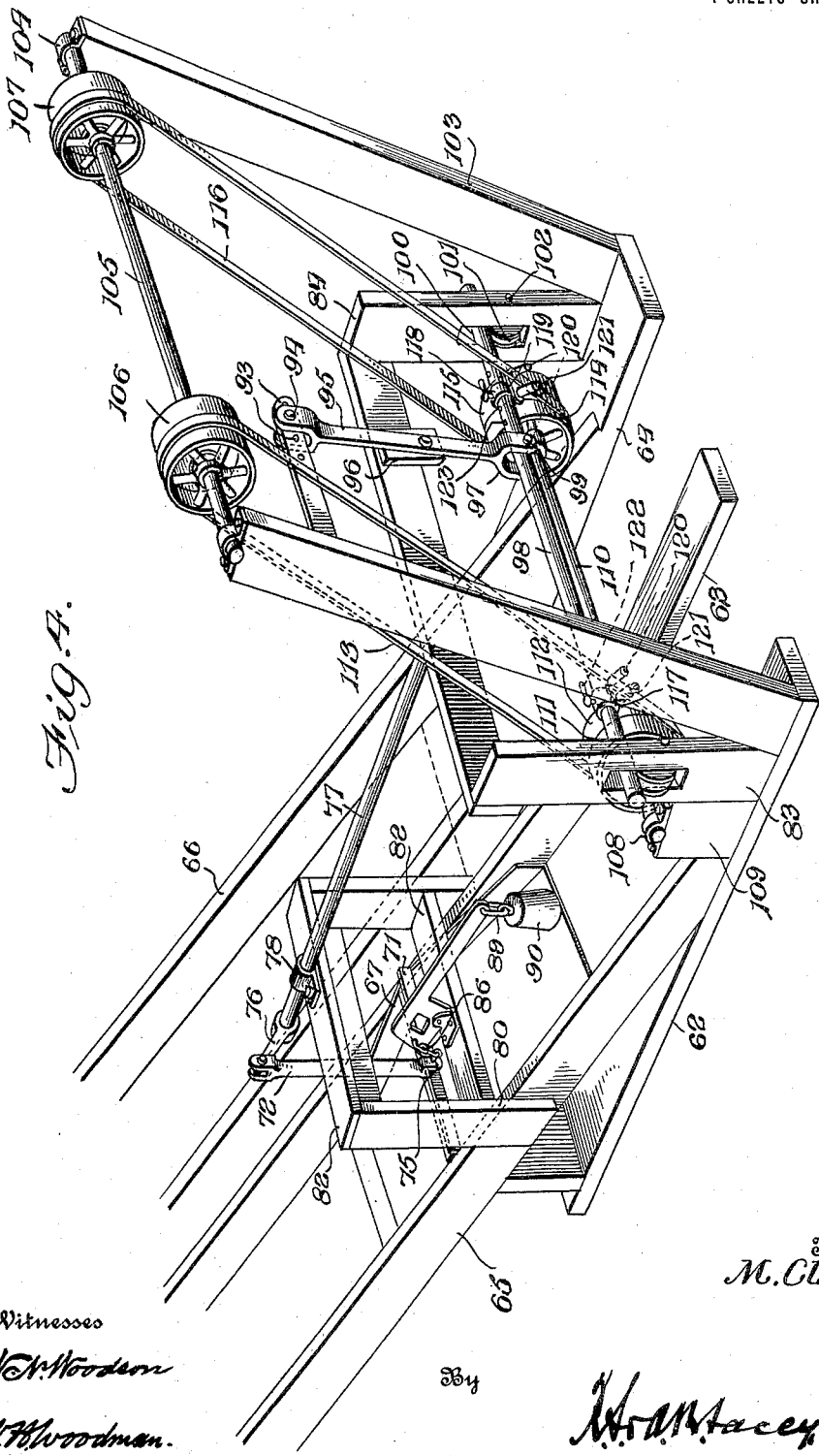
Witnesses
W. N. Woodson
W. K. Woodman
Inventor
M. Clarke.
By
H. H. Stacey, Attorneys M. CLARKE.
BELT SHIFTER FOR COAL JIGGERS.
APPLICATION FILED MAR. 16, 1915.
1,163,216.
Patented Dec. 7, 1915.
4 SHEETS—SHEET 4.
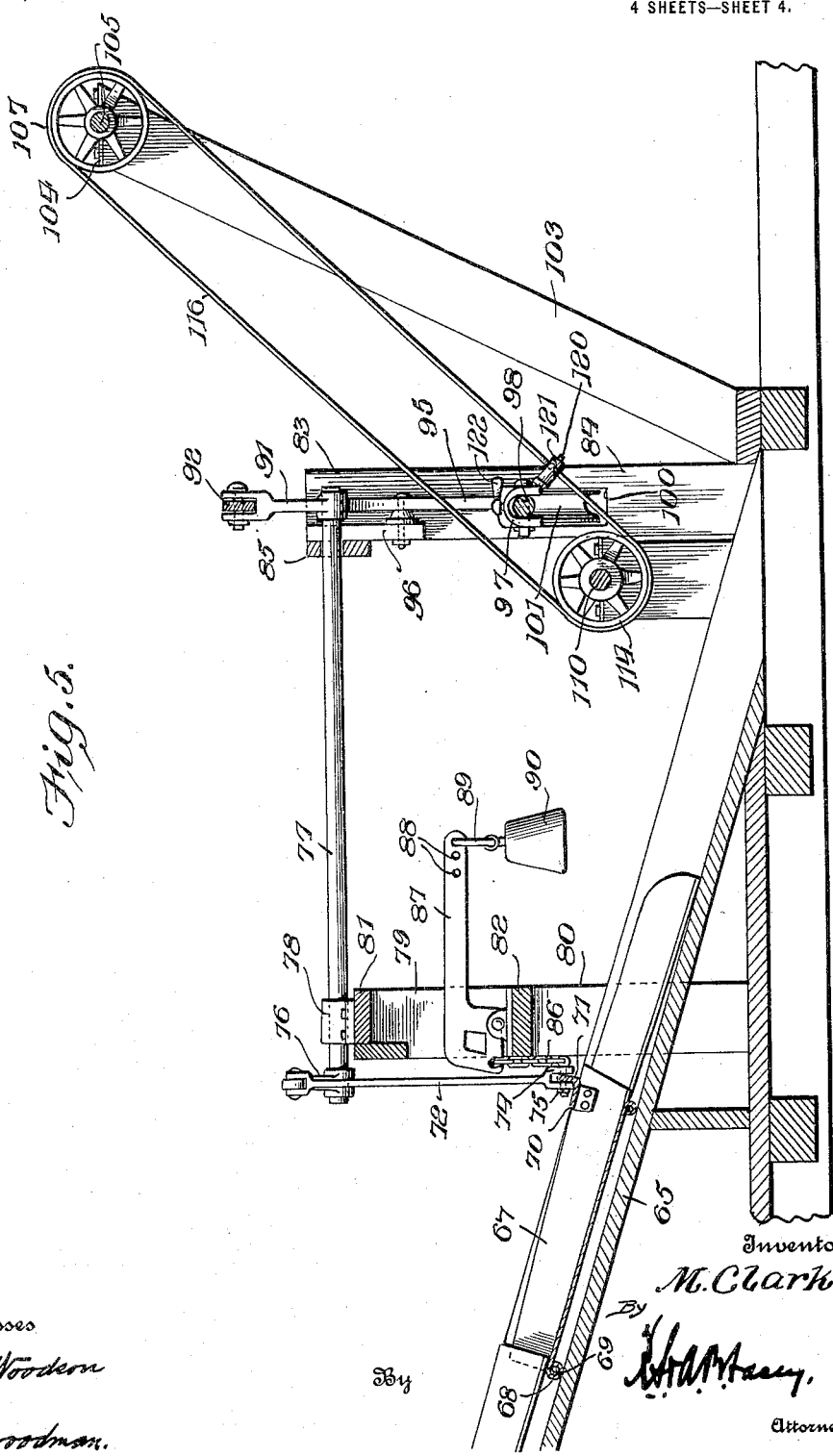

UNITED STATES PATENT OFFICE.

MATTHEW CLARKE, OF WILKES-BARRE, PENNSYLVANIA.

BELT-SHIFTER FOR COAL-JIGGERS.

1,163,216.  Specification of Letters Patent.  Patented Dec. 7, 1915.

Application filed March 16, 1915. Serial No. 14,672.

*To all whom it may concern:*

Be it known that I, MATTHEW CLARKE, a citizen of the United States, residing at Wilkes-Barre, in the county of Luzerne and State of Pennsylvania, have invented certain new and useful Improvements in Belt-Shifters for Coal-Jiggers, of which the following is a specification.

My invention relates to new and useful improvements in controlling mechanisms for controlling supply of power to any machine by mechanism operated by the feeding of material in bulk to such machine, the primary object of my invention consisting in the provision of a belt shifting device which will be automatically operated by the passage of the bulk material being fed to a machine or by the cutting off of supply of such material to such machine.

More specifically, my invention is intended for use in connection with coal jigs and breakers, my intention being to provide a mechanism which shall automatically cut off supply of power to the jig when coal is no longer fed thereto.

In this connection, a still further object of my invention consists in the interposition of a hinged chute member in the main supply chute leading to the jig, the parts of such member being depressible under weight of coal passing therethrough to act upon a rock shaft or other equivalent mechanism to shift the drive belt of the jig.

A still further object of my invention consists in the provision of means for holding the hinged chute member against longitudinal or lateral movement in the chute proper. And a still further object of my invention consists in the provision of means for automatically shifting the belt to cut off supply of power to the jig upon movement of the hinged chute member in one direction.

With these and other objects in view, my invention will be more fully described, illustrated in the accompanying drawings, and then specifically pointed out in the claims which are attached to and form a part of this application.

Figure 1:
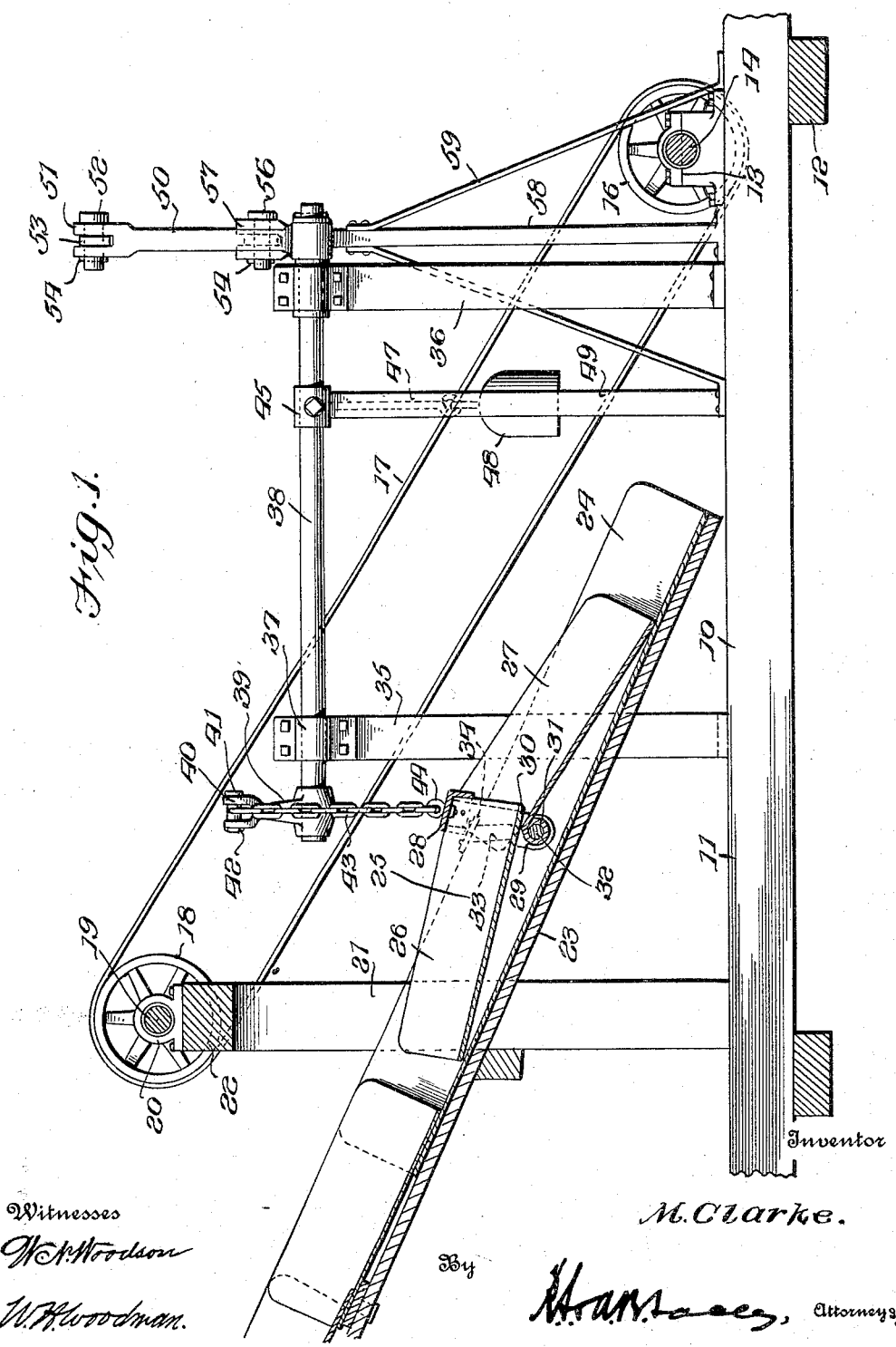
Figure 2:
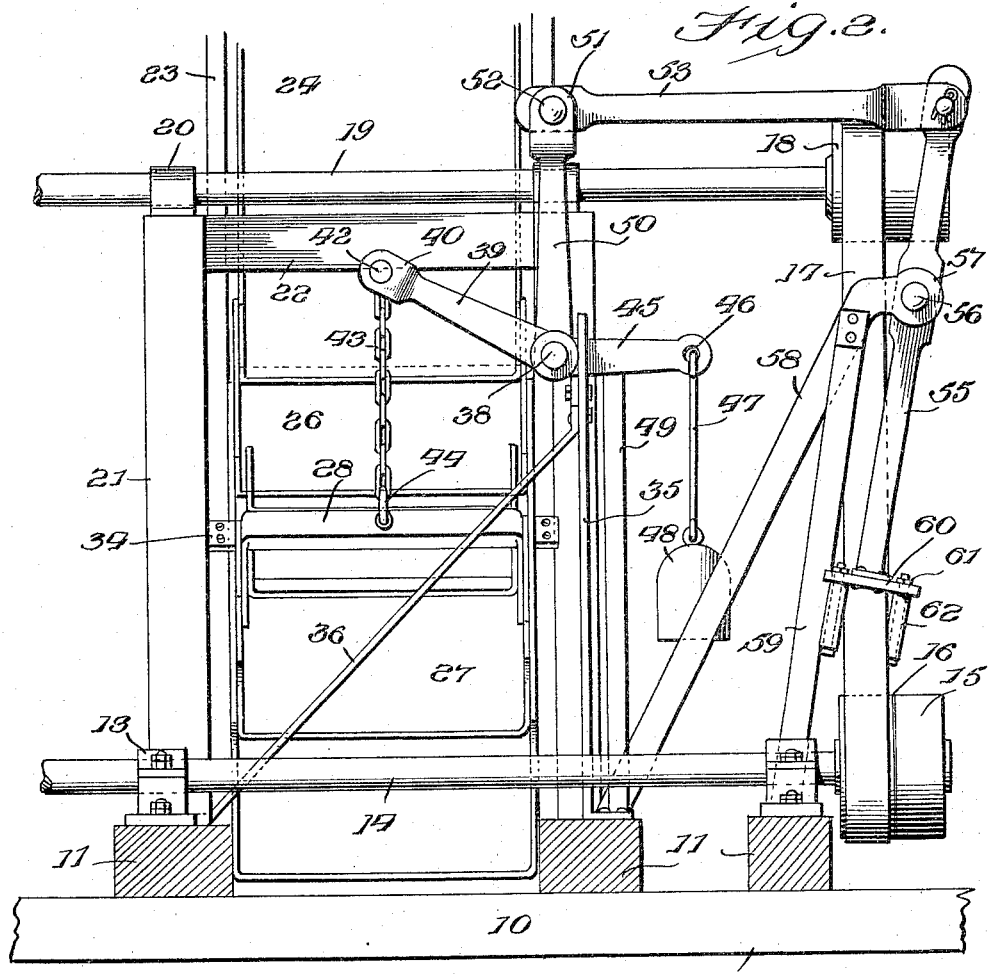
Figure 3:
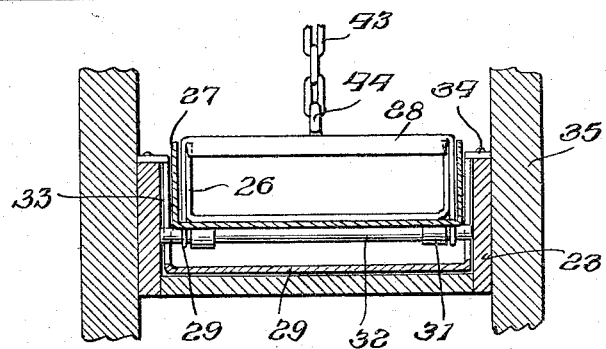

In the drawings: Figure 1 is a side elevational view of my improved device, the main chute and hinged chute member being shown in longitudinal section; Fig. 2 is a front elevational view of the mechanism shown in Fig. 1; Fig. 3 is a detail cross sectional view illustrating certain details in the mounting of the hinged chute member; Fig. 4 is a perspective view of a modified form of my invention; Fig. 5 is a longitudinal view taken through the chute provided with the hinged chute member, illustrating certain details not clearly shown in Fig. 4.

Corresponding and like parts are referred to in the following description and indicated in all the views of the drawings by the same reference characters.

My improved belt shifting mechanism is supported by any suitable frame 10 which may include longitudinal sill members 11 properly braced by transverse sill members 12 and provided adjacent one end with alined bearings 13 to receive the drive shaft 14 of the jig or other machine to be controlled, such machine not being illustrated except for this drive shaft. This drive shaft is provided with a fast pulley 15 and loose pulley 16 and a belt 17 is shiftable from one to the other of these pulleys, being trained about one of them and about a pulley 18 carried by a shaft 19. This shaft is preferably journaled in bearings 20 carried by the upper ends of spaced uprights 21 supported by the side sills of the frame and usually braced at their upper ends by a cross brace 22. As will be understood, the shaft 19 constitutes the drive shaft and may be driven either by an internal combustion engine, electric motor, steam engine or other suitable source of energy, my invention consisting in the provision of means for automatically shifting the belt 17 from the loose pulley 16 to the fixed pulley 15 or the reverse.

The coal or other loose material which is fed in bulk to the jig or similar machine of similar nature, passes through a chute 23, the lower end of which extends between the side sills 11 of the frame and above the jig or other equivalent machine in proper position to discharge any material passing through it to such machine. This chute is preferably rectangular in cross section, open at its top and formed of wood or any other suitable material. If formed of wood, it is generally provided with a metallic lining 24 in order to prevent undue wear, this lining being usually formed in sections in the manner shown in Fig. 1. Supported in an intermediate portion of this chute and extending across the entire width thereof, is a hinged chute member, indicated as a whole by the numeral 25, such chute member including the parts 26 and 27, each equal in width to the width of the chute proper and having side walls fitting closely against the inner faces of the side walls of the chute proper, such portions being open at both ends and at the top. These portions of the hinged chute member are, as a rule, formed of heavy sheet metal and the lower end of the upper portion 26 of the hinged chute member is braced by a transversely extending strip 28 of angle iron secured by rivets or other suitable fastening devices to the side walls of the chute portion with a depending flange projecting slightly over the lower end of the chute, this flange, except for that portion of the brace extending across the top of the chute portion, is cut-away, while the remaining portion of the angle iron extends a slight distance below the bottom of the chute portion to provide an eye 29 at either side of the chute portion. The upper or adjacent end of the chute portion 27 has its bottom cut-away as at 30 to receive the bottom portion of the first chute member section, the side walls of which, at such end, bear snugly against the outer faces of the side walls of the section 26. In cutting away the bottom portion of the section 27, tongues 31 are formed which are bent to provide eyes in alinement with the eyes 29 in order that a hinge pin 32 may be passed through the alined eyes to hingedly connect the sections together. The ends of the hinge pin are extended beyond the side walls of the hinged chute member to seat in vertical slots 33 formed in the side walls of the chute proper, these slots, at their upper ends, being closed by stop plates 34 in order to prevent complete displacement of the hinge pin from the chute proper.

Spaced vertical uprights 35 are secured to one of the side sills 11 of the frame, one of these uprights being located beyond the lower end of the chute and strengthened by a diagonal brace 36. The upper ends of these uprights carry bearings 37 to receive a rock shaft 38 and this rock shaft is provided at one end with a radially directed arm 39 terminating in a fork 40 through the sides of which is passed a pin 41 secured by a cotter pin 42. This pin also passes through a terminal link of a chain 43, the other end of which is connected to an eye-bolt 44 carried by the angle iron brace 28. It will therefore be seen that rocking of the shaft 38 in one direction will raise the adjacent end portions of the sections of the hinged chute member in the manner shown in Fig. 1, while pressure upon such portions of the chute member will cause rocking of the shaft 38 in the opposite direction. A second radially extending arm 45 projects from the intermediate portion of the rock shaft 38 and terminates in an eye 46 to receive one end of a link 47, the free end of which supports a counterweight 48. An upright 49, also carried by the sill 11 of the frame, serves as a stop to limit downward swinging of the arm 45 under the influence of the weight 48. This weight should be just heavy enough to raise the adjacent ends of the sections of the hinged chute member when no coal or other material is passing through the chute, but not heavy enough to prevent depression of such ends to their lowermost position during passage of coal or other material through the chute. The rock shaft 38 also carries a third radially extending arm 50 which normally extends vertically from the shaft, terminating in a fork 51, the sides of which receive a pin 52 which also passes through one end of a link 53, the pivot pin 52 being locked by a cotter pin 54. The free end of the link 53 is pivotally connected to one end of a lever 55 and a pivot pin 56 is passed through the sides of a fork 57 of a diagonally extending brace 58 and through the intermediate portion of the lever 54 to pivotally support such lever. The brace 58 is preferably supported by an additional brace member 59 in the manner shown in Fig. 2. The lower end of the lever 55 projects into close proximity to the upper stretch of the belt 17 and is provided with a cross head 60. Extending from the end portions of the cross head 60 and in parallel relation to each other and to the lever 55, are shafts 61, each of which carries a roller 62, the rollers being adapted to receive the upper stretch of the belt between them. As clearly shown in Fig. 2, the length of the link 53 is such that in raised position of the hinged chute member, or in other words, in lowered position of the counterweight 48, the belt shipper lever 55 will hold the belt 17 upon the loose pulley 16.

In operation, assuming that the pulley 18 is constantly driven, and that in normal position, the belt 17 is upon the idler pulley 16 of the jig shaft 14, it will be clear that as soon as coal or other material is fed through the chute 24, said coal passing through the hinged chute member 25 will depress the intermediate portion of such member and cause turning of the rock shaft against the action of the counterweight 48. This turning movement of the rock shaft is sufficient to act through the radial arm 50, link 53 and belt shipper lever 55 to swing the belt from the loose pulley 16 to the fixed pulley 15, thereby setting the jig in motion. On the other hand, as soon as coal stops passing through the chute, the counterweight will reversely turn the shaft and cause the shipper lever to shift the belt 17 back to the loose pulley and so cut off the supply of power to the jig, the rollers 62, at all times, preventing injury to the belt.

It will of course be understood that various changes may be made in my invention and that by the addition of further rock shafts or of added arms to the rock shaft shown, the device may be made to simultaneously shift any desired number of belts about a machine or about a number of machines. By this means, the feeding of coal or other material through a main chute to branch chutes may be utilized to control the motive power of all jigs or other separators into which the branch chutes discharge. For instance, in Figs. 4 and 5 I have illustrated a somewhat modified form of invention in which the discharge of coal or other material through one chute controls the belt shifters of two jigs. In this form of my invention I provide a platform 62 having spaced cut-away portions 63 and 64 through which the coal or other material may pass from the inclined chutes 65 and 66, respectively, to jigs, not shown. Located within the chute 65, is the hinged chute member 67, corresponding to the hinged chute member 25 previously described, with the exception that the upper end of the upper hinged chute member has its free end downturned to form an eye 68 to receive a hinge pin 69 extending transversely of the chute 65 to hold the hinged chute member against longitudinal movement, the walls of the chute proper 65 not being slotted for the hinge pin of the hinged chute member. The transverse brace 70, corresponding to the brace 28, has its flange 71 directed upwardly instead of downwardly and a link 72 has a bifurcated end to straddle this flange, the link being pivotally connected to the flange by an eye bolt 74 and nut 75. The upper end of this link 72 is also bifurcated to receive one end of a crank arm 76 carried by a rock shaft 77 which is journaled in alined bearings 78. These bearings are carried one by a frame 79 including spaced side frame members 80 and transverse frame members 81 and 82 and the other by a frame 83 including spaced side frame members 84 and a transverse frame member 85.

A chain 86 is connected to the eye bolt 74 at one end and at its other end to a lever 87 pivoted upon the lower transverse brace 82 of the frame 79. The opposite end of this lever is provided with a series of perforations 88 to selectively receive a hook 89 which in turn supports a counterweight 90. This counterweight is of such weight as to hold the hingedly connected ends of the hinged chute member 67 in raised position, except when coal or other material is passing through the chute and the effectiveness of the weight may be varied to adapt it for use with different material by varying the effective length of the lever arm 87 by shifting the hook 89 to one or the other of the perforations 88.

The crank shaft 77, at its forward end, is provided with a second crank arm 91 having a bifurcated upper end to receive one end of a link 92, the opposite end of which is provided with a plurality of perforations 93 to receive a pivot pin 94 by which the link is pivotally connected between the forked terminal of a belt shifting lever 94, which lever is pivoted intermediate its length to a bracket 96 depending from the transverse brace 85 of the frame member 83. The lower end of the belt shifting lever 95 is forked, as shown at 97, to straddle a shaft 98, being connected to this shaft by a pin 99 in such a manner that the shaft may be reciprocated through swinging of the lever 95. This shaft is mounted for reciprocation in slots 100 formed in the end members 84 of the frame 83 and is supported in such slots upon grooved rollers 101 positioned in the slots and rotatable upon shafts 102 journaled in the frame members 84.

Extending upwardly and at a forward inclination from the forward end of the platform 62 and at opposite sides thereof, are supports 103 which carry, at their upper ends, alined bearings 104 for the power shaft 105, which shaft carries the spaced pulleys 106 and 107. Alined bearings 108 carried by supports 109 mounted upon the platform 62, journal the shaft 110 which is parallel to the shaft 105 and which carries a loose pulley 111 and fixed pulley 112 for coöperation with a belt 113 trained about the pulley 106 and loose pulley 114 and fixed pulley 115 for coöperation with a belt 116 trained about the pulley 107. This shaft 110, as will be understood, is to drive the mechanism of both jigs. The shaft 98, which is also parallel to the shaft 110, and which, as a rule, extends between the upper and lower stretches of the belts 113 and 116, carries collars 117 and 118 each provided with a cross head 119 carrying spaced pins 120 to which are attached rollers 121 adapted to engage one upon either side of one of the belts 113 or 116. These collars are held in place upon the shaft by pins or bolts 122 and the shaft is preferably provided with several pin or bolt receiving openings 123 in order to permit proper adjustment of the collars and for an additional reason, which will be later explained.

From the foregoing description, particularly when considered in connection with the operation of my previously described form of belt shifter, the operation of the modified form will be readily understood. The depression of the hinged chute member from the position shown in Figs. 4 and 5 will act through the rock shaft 77, link 92 and belt shifting lever 95 to reciprocate the belt shifting shaft 98 and shift the belts from the loose pulleys 111 and 114 to the fixed pulleys 112 and 115, respectively, thereby causing a driving of the shaft 110. On the other hand, return of the hinged chute member to elevated position, upon stoppage of flow of coal or other material, will reverse the movement of the belt shifting shaft 98 and return the belts 113 and 116 to the idler pulleys. If but one of the two chutes is to be employed, the collar of the belt shifting fork of the other chute may be loosened by removing its set screw and such fork may be thus disengaged from the belt and secured upon the shaft 98 in such a position as not to engage its belt during any shifting movement of the shaft 98. Because of this arrangement, the hinged chute member may, if desired, be rendered inactive and both jigs be driven irrespective of any supply of material to either chute.

In view of the various forms of my invention, above described, it will be clear that I do not wish to limit myself to the exact features of construction illustrated, as various minor changes, within the scope of the appended claims, may be made at any time, without in the slightest degree departing from the spirit of my invention.

Having thus described the invention, what is claimed as new is:

1. In a belt shifting mechanism, the combination with adjacent pulleys and a belt shiftable from one to the other, of a chute, means adapted when actuated to shift the belt from one pulley to the other, and means in the chute depressible under the weight of material passing over it for actuating the first mentioned means.

2. In a belt shifting mechanism, the combination with adjacent pulleys and a belt shiftable from one to the other, of a chute, means adapted when actuated to shift the belt from one pulley to the other, means in the chute adapted when depressed to actuate the first mentioned means, said means in the chute being depressible under the weight of material passing over it, and means operable upon release of the means in the chute for raising such means and for simultaneously shifting the belt to the original pulley.

3. In a belt shifting mechanism, the combination with adjacent pulleys and a belt shiftable from one to the other, of a chute including hingedly connected sections through which material is adapted to pass, means for normally holding the connected ends of such sections at an elevation, said means permitting the connected ends to move downward under weight of material passing through the chute, and means operable by such holding means for shifting the belt from one pulley to the other upon raising and lowering of the connected ends of the chute.

4. In a belt shifting mechanism, the combination with adjacent pulleys and a belt shiftable from one to the other, of a shipper lever engaging the belt, a rock shaft, operative connection between the rock shaft and shipper lever, a chute, and means controlled by discharge of material through the chute for actuating the rock shaft.

5. In a belt shifting mechanism, the combination with a jig shaft, adjacent pulleys, one fixed and one loose upon the shaft, a drive belt shiftable from one pulley to the other and a chute for supplying material to the jig, of means governed by the passage of material through the chute for automatically shifting the belt.

6. In a belt shifting mechanism, the combination with a jig shaft, adjacent pulleys, one fixed and one loose upon the shaft, a drive belt shiftable from one pulley to the other and a chute for supplying material to the jig, of means governed by the passage of material through the chute for automatically shifting the belt, said means being operable when material passes through the chute to shift the belt onto the fixed pulley.

7. In a belt-shifting mechanism, the combination with a jig shaft, adjacent pulleys, one fixed and one loose upon the shaft, a drive belt shiftable from one pulley to the other and a chute for supplying material to the jig, of means governed by the passage of material through the chute for automatically shifting the belt, said means including supplemental chute members having overlapping adjacent ends, a pintle pin hingedly connecting said overlapping ends and movable in slots in the sides of the first chute, a rock shaft, an arm carried by the rock shaft, connection between such arm and the hingedly connected end of one of the supplemental chute sections, a second arm carried by the shaft, a shipper lever pivotally mounted intermediate its length and operatively engaging the belt, and connecting means between the second arm and shipper lever.

8. In a belt shifting mechanism, the combination with a jig shaft, adjacent pulleys, one fixed and one loose upon the shaft, a drive belt shiftable from one pulley to the other and a chute for supplying material to the jig, of means governed by the passage of material through the chute for automatically shifting the belt, said means including supplemental chute members having overlapping adjacent ends, a pintle pin hingedly connecting said overlapping ends and movable in slots in the sides of the first chute, a rock shaft, an arm carried by the rock shaft, connection between such arm and the hingedly connected end of one of the supplemental chute sections, a second arm carried by the shaft, a shipper lever pivotally mounted intermediate its length and operatively engaging the belt, connecting means between the second arm and shipper lever, and means operatively connected to the rock shaft for normally holding the hingedly connected ends of the supplemental chute sections in raised position, such ends being depressible under weight of material passing through the chute.

9. In a belt shifting mechanism, the combination with a jig shaft, adjacent pulleys, one fixed and one loose upon the shaft, a drive belt shiftable from one pulley to the other and a chute for supplying material to the jig, of means governed by the passage of material through the chute for automatically shifting the belt to the fixed pulley when material passes through the chute and to the idler pulley when no material passes, said means including a supplemental chute member depressible under weight of material passing through it, a reciprocally mounted shaft having a belt shifting member engageable with the belt, and means connected to the depressible chute member for reciprocating the shaft.

10. In a belt shifting mechanism, the combination with a jig shaft, adjacent pulleys, one fixed and one loose upon the shaft, a drive belt shiftable from one pulley to the other and a chute for supplying material to the jig, of means governed by the passage of material through the chute for automatically shifting the belt to the fixed pulley when material passes through the chute and to the idler pulley when no material passes, said means including a supplemental chute member depressible under weight of material passing through it, a reciprocally mounted shaft having a belt shifting member engageable with the belt, and means connected to the depressible chute member for reciprocating the shaft, said means including a lever pivoted intermediate its length and engaging the reciprocating shaft to reciprocate it when swung, a rock shaft, crank arms carried by the rock shaft, and links connecting one crank arm with the depressible chute member and the other crank arm with the shaft reciprocating lever.

11. In a belt shifting mechanism, the combination with a jig shaft, adjacent pulleys, one fixed and one loose upon the shaft, a drive belt shiftable from one pulley to the other and a chute for supplying material to the jig, of means governed by the passage of material through the chute for automatically shifting the belt to the fixed pulley when material passes through the chute and to the idler pulley when no material passes, said means including a supplemental chute member depressible under weight of material passing through it, a reciprocally mounted shaft having a belt shifting member engageable with the belt, and means connected to the depressible chute member for reciprocating the shaft, said means including a lever pivoted intermediate its length and engaging the reciprocating shaft to reciprocate it when swung, a rock shaft, crank arms carried by the rock shaft, links connecting one crank arm with the depressible chute member and the other crank arm with the shaft reciprocating lever, and rollers forming a support for the reciprocating shaft.

12. In a belt shifting mechanism, the combination with a jig shaft, adjacent pulleys, one fixed and one loose upon the shaft, a drive belt shiftable from one pulley to the other and a chute for supplying material to the jig, of means governed by the passage of material through the chute for automatically shifting the belt to the fixed pulley when material passes through the chute and to the idler pulley when no material passes, said means including a supplemental chute member depressible under weight of material passing through it, a reciprocally mounted shaft having a belt shifting member engageable with the belt, and means connected to the depressible chute member for reciprocating the shaft, said means including a lever pivoted intermediate its length and engaging the reciprocating shaft to reciprocate it when swung, a rock shaft, crank arms carried by the rock shaft, links connecting one crank arm with the depressible chute member and the other crank arm with the shaft reciprocating lever, rollers forming a support for the reciprocating shaft, a lever operatively connected to the depressible chute member, and a counterweight adjustably mounted upon the lever to raise the chute member when no material is passing through it.

In testimony whereof I affix my signature in presence of two witnesses.

MATTHEW CLARKE. [L. S.]

Witnesses:
JOHN M. JONES,
JOHN WEISENBORN.

Copies of this patent may be obtained for five cents each, by addressing the "Commissioner of Patents, Washington, D. C."